United States Patent
Diamant

(12) United States Patent (10) Patent No.: US 7,321,314 B2
Diamant (45) Date of Patent: Jan. 22, 2008

(54) DEVICE, SYSTEM AND METHOD OF DETECTION OF INPUT UNIT DISCONNECTION

(75) Inventor: Nimrod Diamant, Kfar Saba (IL)

(73) Assignee: Intel Corporation, Santa Clara, CA (US)

( * ) Notice: Subject to any disclaimer, the term of this patent is extended or adjusted under 35 U.S.C. 154(b) by 161 days.

(21) Appl. No.: 11/074,626

(22) Filed: Mar. 9, 2005

(65) Prior Publication Data
US 2006/0208884 A1 Sep. 21, 2006

(51) Int. Cl.
*G08B 21/00* (2006.01)

(52) U.S. Cl. .................................. 340/657; 340/568.4

(58) Field of Classification Search ................ 340/657, 340/687, 686.4, 568.4, 815.47; 710/15; 345/163
See application file for complete search history.

(56) References Cited

U.S. PATENT DOCUMENTS

| 4,736,195 | A  | * | 4/1988  | McMurtry et al. | ....... | 340/568.3 |
| 6,489,890 | B1 | * | 12/2002 | Inoue           | ....... | 340/568.1 |
| 6,741,593 | B1 | * | 5/2004  | Sun et al.      | ....... | 370/392   |
| 6,744,150 | B2 | * | 6/2004  | Rendic          | ....... | 307/38    |
| 6,784,802 | B1 | * | 8/2004  | Stanescu        | ....... | 340/687   |
| 6,995,747 | B2 | * | 2/2006  | Casebolt et al. | ....... | 345/157   |
| 7,019,658 | B1 | * | 3/2006  | Erickson et al. | ....... | 340/635   |
| 2004/0001307 | A1 |   | 1/2004 | Takakusaki |  |  |
| 2005/0033890 | A1 |   | 2/2005 | Lee |  |  |

FOREIGN PATENT DOCUMENTS

| EP | 0 552 873 | 7/1993 |
| EP | 0 853 284 | 7/1998 |

OTHER PUBLICATIONS

The PS/2 Mouse/Keyboard Protocol, Copyright 1999, Adam Chapweske, http://panda.cs ndsu.nodak edu/~achapwes/PICmicro/PS2/ps2.htm pp. 1-7.
"Keyboard Detection in a Pen-Based Computer System". IBM Technical Disclosure Bulletin. IBM Corp. vol. 37. No. 6A. Jun. 1, 1994, pp. 515-516.
International Search Report for PCT/US2006/008706 mailed Sep. 8, 2006.

* cited by examiner

*Primary Examiner*—John Tweel, Jr.
(74) *Attorney, Agent, or Firm*—Pearl Cohen Zedek Latzer, LLP

(57) ABSTRACT

Briefly, a detector to detect a connection status of an input unit to a standard socket of a computing platform based on an operational property of the input unit.

25 Claims, 3 Drawing Sheets

DEVICE, SYSTEM AND METHOD OF DETECTION OF INPUT UNIT DISCONNECTION

BACKGROUND OF THE INVENTION

A computing platform may include input units, for example, a keyboard and a mouse, which may be connected to a motherboard through connectors and sockets, e.g., standard PS/2 connectors and sockets. An input unit may be unintentionally disconnected from the motherboard, for example, when a user unintentionally pulls out the input unit connector from its corresponding motherboard socket. An input unit may be intentionally disconnected from the motherboard, for example, when a person attempts to steal the input unit, e.g., from a terminal or a workstation at a public computer center. Unfortunately, existing computing platforms are unable to detect that an input unit has been disconnected from the motherboard.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

Figure 1:
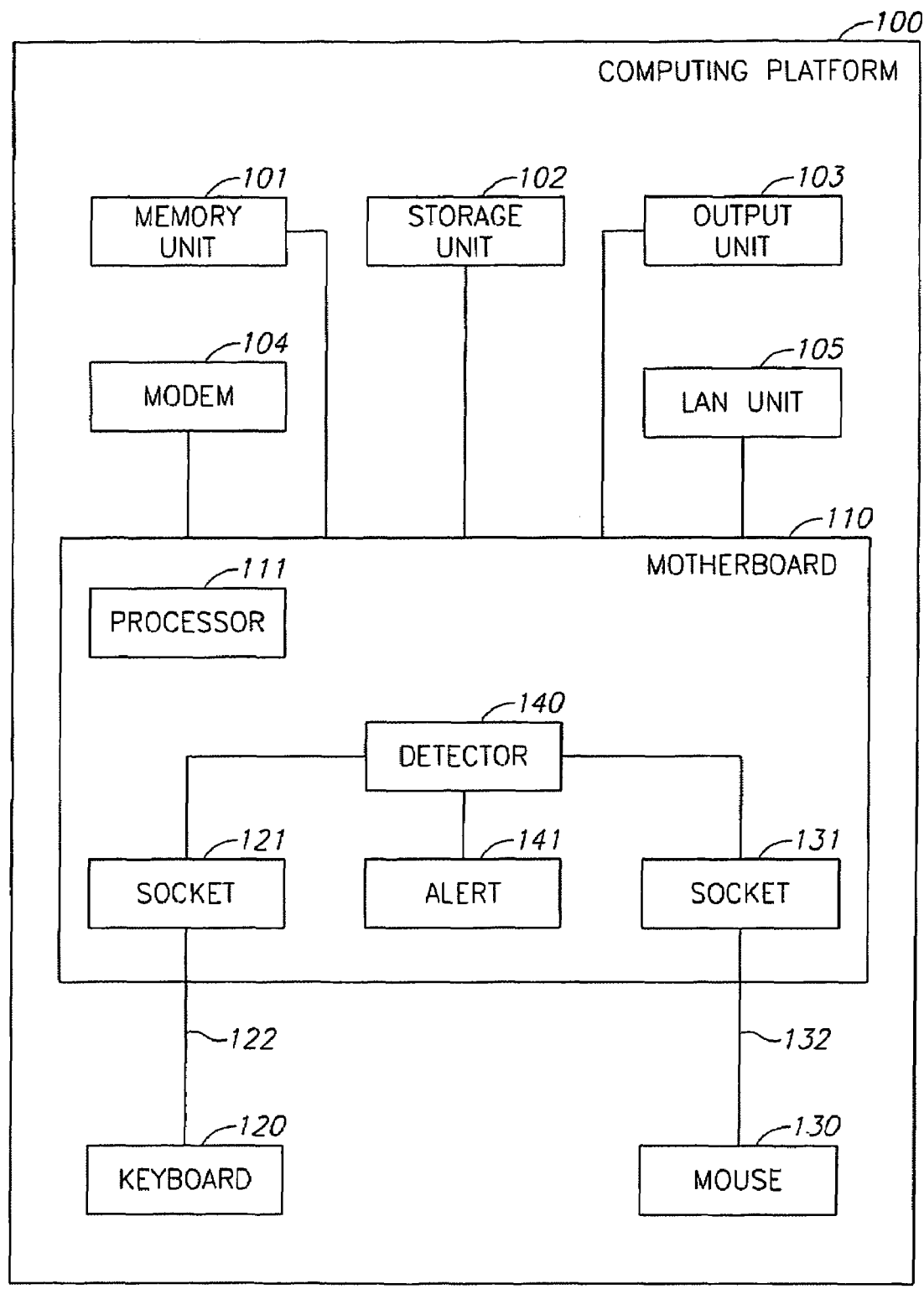
FIG. 1 is a schematic block diagram illustration of a computing platform able to detect an input unit disconnection, in accordance with an exemplary embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details, In other instances, well-known methods, procedures, components, units and/or circuits have not been described in detail so as not to obscure the invention.

The term "standard keyboard/mouse socket" as used herein relates to a socket in a computing platform (e.g., on a motherboard or other board or card) able to connect to standard keyboard or mouse. For example, a standard keyboard/mouse socket may include a standard PS/2 socket, a standard mini-PS/2 socket, other PS/2-type socket, an AT socket, a XT connector, a five-pin DIN socket, or a six-pin mini-DIN socket. In some embodiments, a standard keyboard/mouse socket may be a standard socket used substantially exclusively for connecting keyboard units and/or mouse units to a computing platform, may not be used for connecting other devices (e.g., a scanner, a printer, a digital camera, a disk-on-key device, or the like) to a computing platform, may not be a Universal Serial Bus (USB) socket, or may be a non-USB socket.

The term "standard keyboard/mouse connector" as used herein relates to a standard connector of an input unit (e.g., a keyboard or a mouse) able to connect to a computing platform (e.g., to a motherboard or other board or card). For example, in some embodiments, a standard keyboard/mouse connector may include a standard PS/2 connector, a standard mini-PS/2 connector, other PS/2-type connector, an AT connector, a XT connector, a five-pin DIN connector, or a six-pin mini-DIN connector. In some embodiments, a standard keyboard/mouse connector may be a standard connector used substantially exclusively for connecting keyboard units and/or mouse units to a computing platform, may not be used for connecting other devices (e.g., a scanner, a printer, a digital camera, a disk-on-key device, or the like) to a computing platform, may not be a Universal Serial Bus (USB) connector, or may be a non-USB connector.

In some embodiments, a standard keyboard/mouse socket and/or a standard keyboard/mouse connector may include, for example, a five-pin DIN interface, an AT interface or a XT interface having a first pin to transfer clock data, a second pin to transfer input data (e.g., keyboard data or mouse data), a third pin which may be non-used in some implementations, a fourth pin to connect to a sink, and a fifth pin to connect to a power source (e.g., a voltage source of approximately 5 or 3 Volts). In some embodiment, a standard keyboard/mouse socket and/or a standard keyboard/mouse connector may include, for example, a six-pin mini-DIN interface or a PS/2-type interface having a first pin to transfer input data (e.g., keyboard data or mouse data), a second pin which may be non-used in some implementations, a third pin to connect to a sink, a fourth pin to connect to a power source (e.g., a voltage source of approximately 5 or 3 Volts), a fifth pin to transfer clock data, and a sixth pin which may be non-used in some implementations. Other suitable combinations of various pins, which may be used or non-used and/or may have various functionalities, may be used in accordance with embodiments of the invention.

FIG. 1 schematically illustrates a block diagram of a computing platform 100 able to detect an input unit disconnection, in accordance with some embodiments of the invention. Computing platform 100 may include or may be implemented as, for example, a personal computer, a desktop computer, a server computer, a workstation, a tablet computer, a mobile computer, a laptop computer, a notebook computer, or other suitable computers or computing devices.

Computing platform 100 may include, for example, a processor 111 attached to a motherboard 110, a memory unit 101, a storage unit 102, an output unit 103, an optional modem 104, an optional Local Area Network (LAN) interface unit 105, and one or more input units, for example, a keyboard 120 and a mouse 130 Computing platform 100 may include other suitable hardware components and/or software components.

Processor 111 may include, for example, a Central Processing Unit (CPU), a Digital Signal Processor (DSP), a microprocessor, a controller, a chip, a microchip, an Integrated Circuit (IC), or any other suitable multi-purpose or specific processor or controller.

Motherboard 110 may include, for example, a board, a card, a surface, or circuitry able to support and/or interconnect components of computing platform 100, Memory unit 101 may include, for example, a Random Access Memory (RAM), a Read Only Memory (ROM), a Dynamic RAM (DRAM), a Synchronous DRAM (SD-RAM), a Flash memory, a volatile memory, a non-volatile memory, a cache memory, a buffer, a short term memory unit, a long term memory unit, or other suitable memory units or storage units.

Storage unit 102 may include, for example, a hard disk drive, a floppy disk drive, a Compact Disk (CD) drive, a CD-ROM drive, or other suitable removable or non-removable storage units.

Output unit 103 may include, for example, a Cathode Ray Tube (CRT) monitor, a Liquid Crystal Display (LCD) monitor, a plasma monitor, or other suitable monitor or display unit.

Modem 104 may include, for example, an internal or external modem card or modem unit able to transmit and/or receive data through wireless or wired communication, e.g., in accordance with Institute of Electrical and Electronics Engineers (IEEE) 802.11 standard, IEEE 802.16 standard, or other standards or protocols.

LAN interface unit 105 may include, for example, an internal or external card or unit able to connect computer platform 100 to a LAN, a Wireless LAN (WLAN), an Ethernet network, a token ring network, a network in accordance with IEEE 802.3 standard, or other system or network.

Although two input units are shown, namely, keyboard 120 and mouse 130, embodiments of the invention are not limited in this regard. For example, in some embodiments, a single input unit or more than two input units may be used. Such input units may include, for example, a touch-pad, a light-pen, a keypad, a track-ball, or other suitable pointing devices or input devices having a connector compatible with a standard keyboard/mouse connector.

In some embodiments, keyboard 120 may be connected to a standard keyboard/mouse socket 121 on motherboard 110, e.g., through a cable 122. Similarly, mouse 130 may be connected to a standard keyboard/mouse socket 131 on motherboard 110, e.g., through a cable 132.

Sockets 121 and/or 131 may be connected to a detector 140, which may include, for example, a detection circuit able to detect disconnection of keyboard 120 from socket 121 and/or disconnection of mouse 130 from socket 131 ("disconnection event"). In some embodiments, detector 140 may monitor and detect a connection status (e.g., connection or disconnection) of the mouse 130 and/or the keyboard 120, based on an operational property (e.g., an operational voltage or a clock signal) of the mouse 130 and/or the keyboard 120, respectively.

Upon detection of a disconnection event, detector 140 may send a signal or a message to an alert unit 141, which may include one or more alert mechanisms or alarm units. In some embodiments, alert unit 141 may be included in motherboard 110, may be included in computing platform 100, may be a separate or stand-alone unit external to computing platform 100, or may be included in another computing platform operatively connected to computing platform 100. Additionally or alternatively, upon detection of a disconnection event, detector 140 may send a signal or a message to the LAN interface unit 105 and/or the modem 104, which may transfer a pie-defined message (e.g., a warning message or an alarm notification) to another computing platform, e.g., through a wired or wireless network, or through a wired or wireless communication link.

In some embodiments, upon detection of a disconnection event by detector 140, one or more pre-defined operations may be performed by computing platform 100. In one embodiment, for example, upon detection of a disconnection event by detector 140, computing platform 100 may be brought into an active mode or a fully-operational mode, e.g., from a standby mode, a power saving mode, or other non-active mode. In some embodiments, upon detection of a disconnection event, detector 140 may send to processor 111 and/or alert unit 141 a message, a signal or an indication that a disconnection event occurred. In one embodiment, the message or signal may include an indication of one or more properties of the disconnection event, for example, identification of the input unit that was disconnected (namely, keyboard 120 or mouse 130), the time and date in which the indication event occurred, or other information. In some embodiments, in response to the detection of the disconnection event, a warning message may be displayed, for example, using output unit 103 of computing platform 100, or using another output unit of another computing platform. In some embodiments, an audio message may be sounded, for example, using a sound card and/or speakers which may be included in computing platform 100, or using a sound card and/or speakers which may be included in another computing platform. In some embodiments, computing platform 100 may send a message, using modem 104 and/or LAN interface unit 105, to another computing platform (e.g., to an administrator computer) indicating that a disconnection event occurred in computing platform 100. In one embodiment, the LAN interface unit 105 may send the message without modifying the operational status of computing platform 100, e.g., while computing platform 100 is in a stand-by mode, in a reduced-power mode, in a "sleep" mode, in a "hibernation" mode, or the like. Other suitable operations may be performed in response to a disconnection event.

Figure 2:
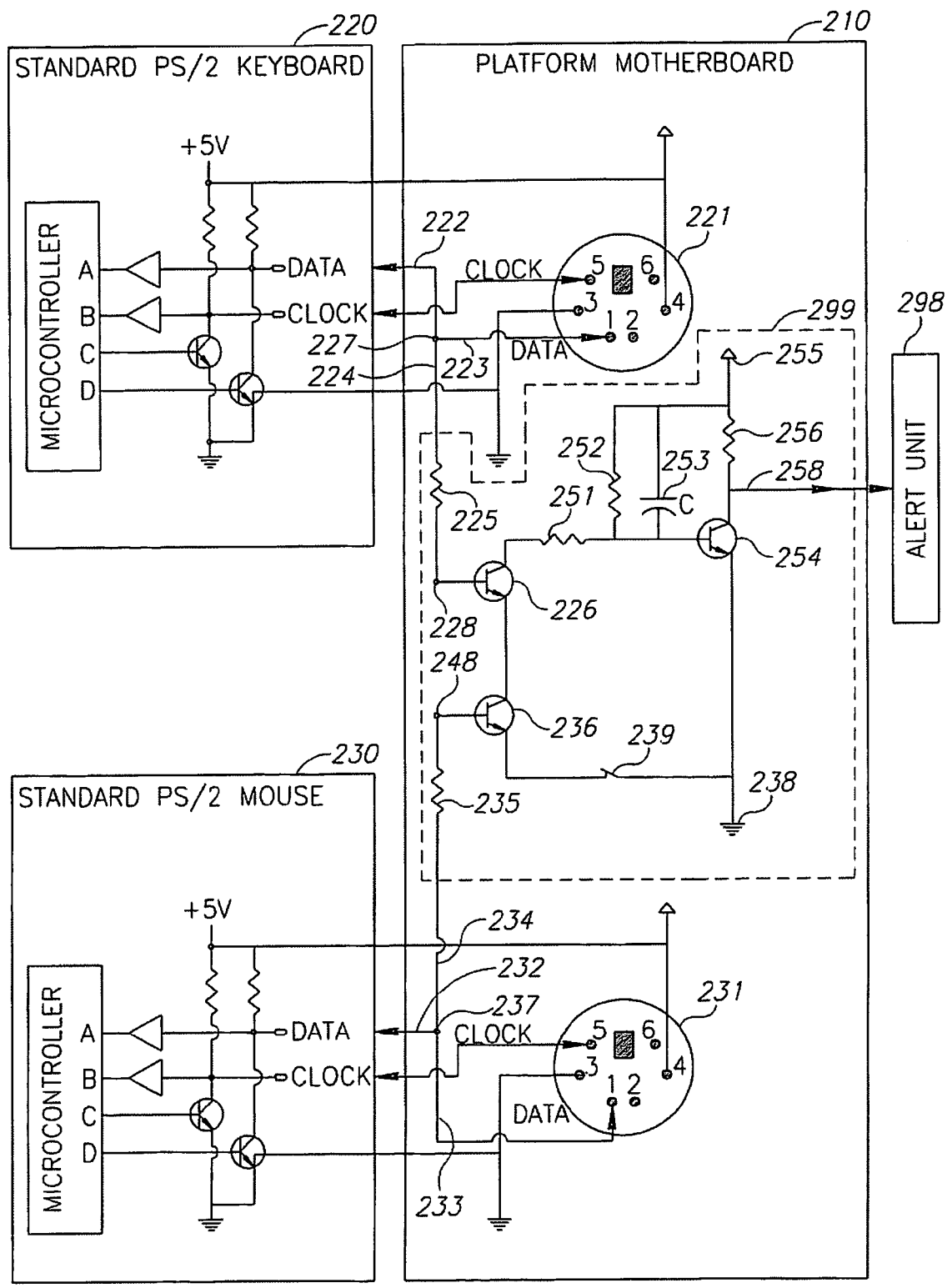
FIG. 2 is a schematic block diagram illustration of a circuit able to detect an input unit disconnection in accordance with an exemplary embodiment of the invention.

FIG. 2 schematically illustrates a circuit 210 (e.g., a motherboard circuit or sub-circuit) able to detect an input unit disconnection, in accordance with some embodiments of the invention, associated with a standard (e.g., PS/2) keyboard circuit 220 and a standard (e.g., PS/2) mouse circuit 230. In some embodiments, circuit 210 may be integrated with computing platform 100 of FIG. 1, for example, as part of motherboard 110. Circuit 210 may include, for example, a standard keyboard/mouse socket 221 (e.g., able to connect to a PS/2 keyboard), and a standard keyboard/mouse socket 231 (e.g., able to connect to a PS/2 mouse).

Keyboard circuit 220 may transfer keyboard data (e.g., data indicating a keypress) to motherboard circuit 210 through a conductor 222. Data received through conductor 222 at a node 227 may be transferred to socket 221 through a conductor 223, and may also be transferred through a conductor 224 to a detection circuit 299, which is described in detail below.

Similarly, mouse circuit 230 may transfer mouse data (e.g., data indicating mouse movement, pressing of a mouse button, or scrolling of a mouse scroll button) to motherboard circuit 210 through a conductor 232, Data received through conductor 232 at a node 237 may be transferred to socket 231 through a conductor 233, and may also be transferred through a conductor 234 to detection circuit 299.

Within detection circuit 299, the keyboard data received through conductor 224 may optionally pass through a resistor 225, and may be received as input by a gate terminal of a transistor 226. Similarly, the mouse data received through conductor 234 may optionally pass through a resistor 235, and may be received as input by a gate terminal of a transistor 236. The resistors 225 and 235 may, for example, adapt the current received by the gate terminals of transistors 226 and 236, respectively, e.g., to accommodate specific operational requirements of transistors 226 and 236 in accordance with specific implementations of detection circuit 299. In one embodiment, for example, resistor 225 and/or resistor 235 may have a resistance of, for example, approximately 10 KiloOhm, approximately 50 KiloOhm, or any other suitable values.

A drain terminal of transistor 226 may be connected to a source terminal of transistor 236, and a drain terminal of transistor 236 may be connected to a sink 238, e.g., directly or optionally through one or more switches 239 as described below. A source terminal of transistor 226 may be connected, through a resistor 251, to a Resistor-Capacitor (RC) sub-circuit, which may include a resistor 252 connected in parallel to a capacitor 253. The RC sub-circuit may be connected to a gate terminal of a transistor 254; the drain terminal of transistor 254 may be connected to sink 238, and the source terminal of transistor 254 may be connected to a power source 255, optionally through a pull-up resistor 256.

When a keyboard is connected to socket 221, conductor 224 may become active, allowing keyboard data to pass therethrough. Conductor 224 may have a measurable operational voltage (e.g., at a node 228), which may be related to the status of the connection of the keyboard to socket 221. For example, the voltage at node 228 may be relatively low when keyboard data is transferred from the keyboard to socket 221, relatively high when keyboard data is not transferred, and substantially zero (e.g., for at least a pre-defined period of time) when the keyboard is not connected to socket 221.

Similarly, when a mouse is connected to socket 231, conductor 234 may become active, allowing mouse data to pass therethrough. Conductor 234 may have a measurable operational voltage (e.g., at a node 248), which may be related to the status of the connection of the mouse to socket 231. For example, the voltage at node 248 may be relatively low when mouse data is transferred from the mouse to socket 231, relatively high when mouse data is not transferred, and substantially zero (e.g., for at least a pre-defined period of time) when the mouse is not connected to socket 231.

Accordingly, when both the mouse and the keyboard are connected to sockets 221 and 231, respectively, there may be a non-zero operational voltage at the inputs of transistors 226 and 236, which are part of detection circuit 299, and a resultant current in the detection circuit 299 may charge the capacitor 253. Consequently, an output 258 of the detection circuit 299 may provide a non-zero output signal to an alert unit 298, e.g., an alert controller, an Input/Output Control Hub (ICH), or ICH5. When the mouse and keyboard are connected to sockets 221 and 231, respectively, and capacitor 253 is charged, the output signal from output 258 may have a high value (for example, a voltage of approximately 3 or 5 Volts, or other non-zero voltage), which may indicate that both the mouse and the keyboard are connected.

Within detection circuit 299, the transistors 226 and 236 may operate similar to a logical AND gate, such that, for example, when at least one of the mouse and keyboard is not connected to its respective socket, the transistors 226 and 236 may provide low sink current. When the sink current provided by transistors 226 and 236 is low, capacitor 253 may discharge, and the output signal provided by output 258 may have a low value (for example, a voltage of zero or substantially zero Volts), indicating that at least one of the mouse and the keyboard is not connected to its respective socket.

The detection circuit 299 may allow dynamic, immediate and/or real-time detection of disconnection of an input unit. For example, the operational voltage at output 258 may be monitored substantially continuously, and a significant, sudden or abrupt voltage drop (e.g., from a high value to a low value or to a substantially zero value) may indicate that at least one of multiple input units is disconnected from its respective socket.

In some embodiments, the properties of capacitor 253, resistor 251, resistor 252, resistor 256, resistor 225 and/or resistor 235 may be selected or adjusted, for example, to yield specific detection performance. For example, in one embodiment, the properties of components of detection circuit 299 are selected such that the detection circuit 299 is able to distinguish between a disconnection event, e.g., disconnection of the mouse and/or keyboard from their respective sockets, and pseudo-random or arbitrary changes of voltage during normal operation of the input devices. For example, the detection circuit 299 may be adapted to ignore changes in voltage (e.g., between idle time periods and/or during keyboard or mouse activity), during normal operation, when the mouse and/or keyboard are connected and transfer data to their respective sockets. In one embodiment, for example, components of detection circuit 299 may be selected or adjusted such that the characteristic discharge time of capacitor 253 is longer than a characteristic time period required for transfer of one data item (e.g., frame or packet) of the mouse and/or keyboard, i.e., a longest characteristic time period between reception of consecutive packets of data from the keyboard or the mouse during their normal operation. In one embodiment, for example, components of detection circuit 299 may be selected or adjusted such that the characteristic discharge time of capacitor 253 is longer than approximately 0.1 millisecond.

In some embodiments, the properties of components of detection circuit 299 may be selected or adjusted to allow capacitor 253 to charge relatively quickly, e.g., within a time period smaller than the time period typically required for transferring one bit of mouse data or keyboard data.

In some embodiments, optionally, transistors 226 and 236 may be connected to sink 238 by passing through switch 239, for example, an intrusion detection switch or a chassis intruder switch able to detect that the chassis or housing of a computing platform is opened or tampered with. The switch 239 may be in a "closed" state when the chassis is closed, and in an "open" state when the chassis is open or partially open. When the switch 239 is in an "open" state, transistors 226 and 236 may not provide a current to resistor 251, thereby causing the capacitor 253 to discharge and causing the output 258 to be in a "low" state. This may, for example, allow transistors 226 and 236 to detect disconnection of the keyboard, disconnection of the mouse, and/or opening or tampering with the chassis or housing of the computing platform.

Although disconnection of the keyboard or mouse may be detected by monitoring incoming data signals, embodiments of the invention are not limited in this regard, and may additionally or alternatively include, for example, monitoring of a clock signal received from the keyboard and/or of a clock signal received from the mouse. For example, in one embodiment, a circuit or sub-circuit may be in a "closed" state when clock signals are received from the mouse and the keyboard, and may be in an "open" state when clock signals are not received from at least one of the mouse and the keyboard This may allow detection of disconnection based on monitoring of the clock signal.

Other suitable circuits and sub-circuits may be used in accordance with embodiments of the invention, to detect disconnection of a mouse and/or keyboard. In one embodiment, for example, multiple circuits may be used in conjunction with multiple input units; for example, a first circuit may be used to detect a disconnection of a keyboard, and a second, separate circuit may be used to detect a disconnection of a mouse. In another embodiment, other suitable components may be used to monitor the operational voltage of a keyboard, a mouse, or other input units having a standard keyboard/mouse connector or able to connect to a standard keyboard/mouse socket. In some embodiments, for example, differential amplifiers, Schmitt-triggers, counters, accumulators, timers, digital counters, digital circuits, reset mechanisms, flip-flops, may be used instead of or in addition to transistors, resistors and/or capacitors.

Some embodiments may use calculation or threshold values based on analysis of incoming data received from the mouse and/or the keyboard. For example, in one embodiment, data may be transferred from the standard keyboard/mouse connector to the standard keyboard-mouse socket in accordance with a pre-defined protocol, e.g., a serial protocol having 1-bit frames or 12-bit frames. In one embodiment, for example, the data may include a start-bit (e.g., having a value of zero), eight data bits (e.g., having a least-significant bit first), a parity bit (e.g., odd parity, or even parity), and a stop-bit (e.g., having a value of one). In some embodiments, a digital implementation may be used, for example, implemented as a digital circuit or a combination of hardware and/or software components, to monitor the bits of information received from the mouse and/or keyboard.

For example, in one embodiment, based on the clock frequency (e.g., in the range of approximately 10 to 16.7 KHz), a period of time required or sufficient for transferring one frame of data (e.g., an 11-bit frame) may be determined ("frame transfer period"). The detector may monitor received frames or bits, periodically or substantially continuously, to determine whether or not a stop-bit (e.g., having a value of one) was received for a period of time equal to or greater than the frame transfer period, e.g., 150 percent or 200 percent of the frame transfer period ("frame inspection period"). For example, in one embodiment, the frame transfer period may be equal to approximately 0.1 millisecond, such that a stop-bit is received (e.g., within approximately or under 0.1 millisecond from receiving a start-bit) when the keyboard or mouse is connected to its respective socket. If, during a frame inspection period (e.g., approximately 0.1 millisecond, 0.15 millisecond, 0.2 millisecond, or other pre-defined period), a stop-bit is not received, then it may be determined that the input unit is disconnected from its respective socket.

In another embodiment, for example, the computing platform (e.g., using a hardware component, a software component, an Operating System, or the like) may periodically or substantially continuously attempt to access the input unit, or attempt to communicate with the input unit, and may detect a disconnection event if the access attempt or the communication attempt fails.

In yet another embodiment, a digital implementation may be used (e.g., implemented as a digital circuit and/or as a software component), in which a buffer or a counter may accumulate bits of data received from the input unit. The buffer or counter may be reset upon receipt of a stop-bit, and may be used to determine a disconnection event if, for example, a stop-bit was not received for a pre-defined period of time (e.g., a frame inspection period). For example, in one embodiment, if a bit having a value of "one" was not received within a time period accommodating transfer of an 11-bit frame, then a disconnection event may be determined.

In some embodiments, reversed polarity may be used, for example, such that a component is in "high" state when the keyboard or mouse is connected to its respective socket, and the component is in "low" state when the keyboard or mouse is not connected to its respective socket.

In some embodiments, disconnection of the mouse and/or keyboard may be detected even when the computing platform is in a non-active mode, a stand-by mode, a power-saving mode, a "sleep" mode, or the like. For example, in one embodiment, the keyboard and mouse may receive (e.g., from the computing platform) or supply an operational voltage, which may be monitored by detection circuit 299, even when the computing platform is in a stand-by or power-saving mode, thereby allowing the detection circuit 299 to detect disconnection of the mouse and/or keyboard even the computing platform is not fully operational.

Figure 3:
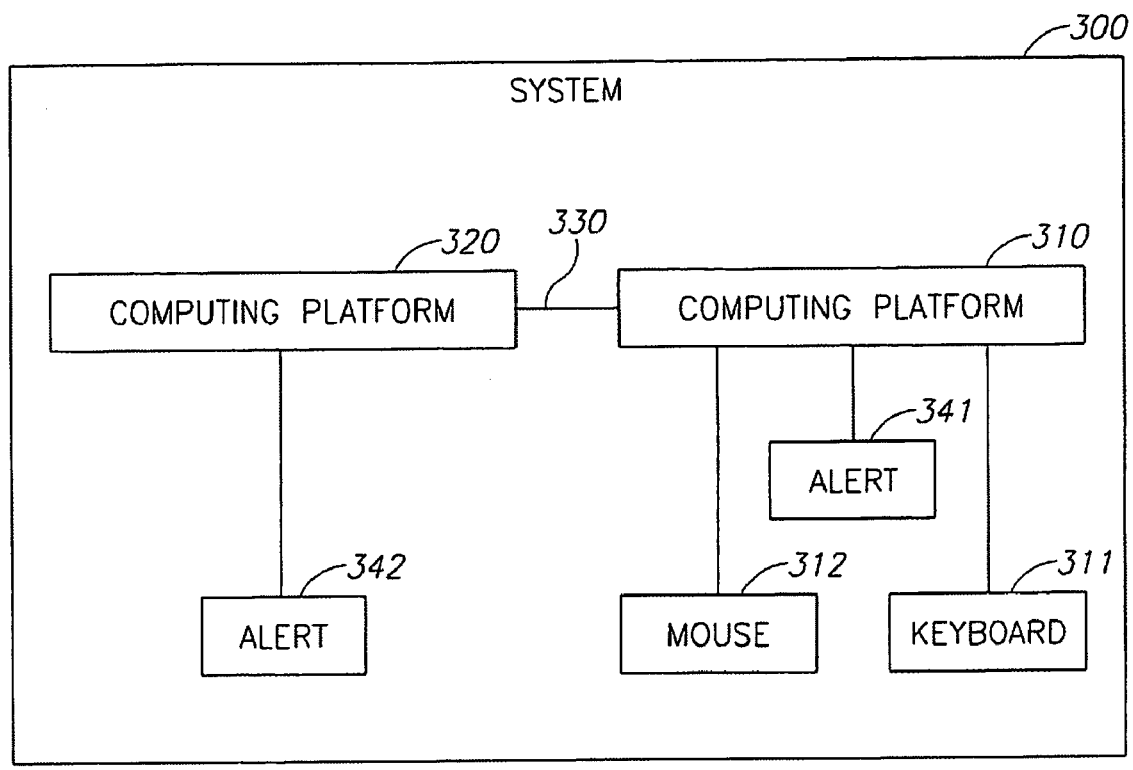
FIG. 3 is a schematic block diagram illustration of a system able to detect an input unit disconnection, in accordance with an exemplary embodiment of the invention.

FIG. 3 schematically illustrates a block diagram of a system 300 able to detect an input unit disconnection, in accordance with some embodiments of the invention. System 300 may include a plurality of computing platforms, for example, computing platforms 310 and 320, which may be interconnected using a wired or wireless link 330. In one embodiment, for example, computing platform 320 may include an administrator or manager workstation, whereas computing platform 310 may include a user workstation Computing platform 310 may be connected to one or more input units, for example, a keyboard 311 and a mouse 312. Computing platform 310 may be able to detect a disconnection event of one or more of the input units, for example, using circuits as described with reference to FIG. 2. Upon detecting the disconnection event, computing platform 310 may send to computing platform 320 a message indicating that a disconnection event occurred at computing platform 310. The message may include, for example, an indication of one or more properties of the disconnection event, for example, identification of the computing platform associated with the disconnection event (namely, computing platform 310), the time and date in which the indication event occurred, or other information In some embodiments, an alert unit 341 may be included in, or associated with, computing platform 310, and an alert unit 342 may be included in, or associated with, computing platform 320. Upon detection of the disconnection event, alert units 341 and/or 342 may be activated or may perform one or more pre-defined operations, for example, may sound an audible alert, may display a visual alert, may send a notification via electronic mail, may send a notification to a pager or via a paging system, may send a notification via a Short Message Service (SMS), may send a notification by an Instant Messaging (IM) service, or the like.

Figure 4:
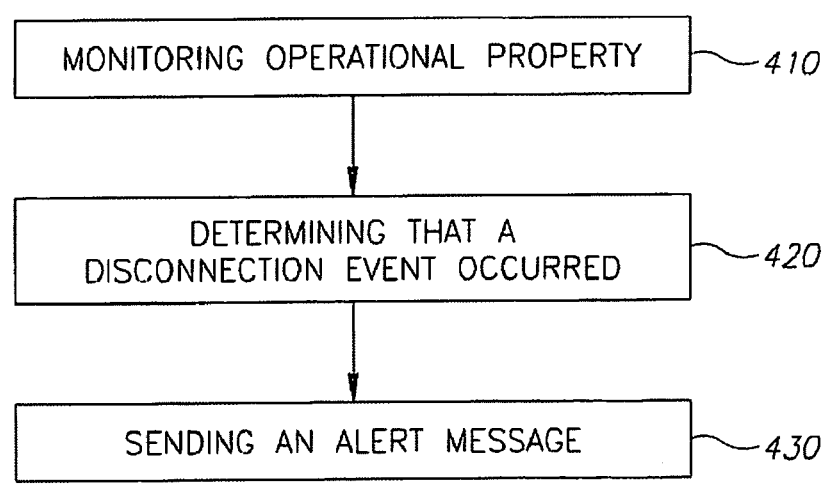
FIG. 4 is a schematic flow-chart of a method of detecting input unit disconnection in accordance with an exemplary embodiment of the invention.

FIG. 4 is a flow-chart diagram of a method of detecting input unit disconnection, in accordance with some embodiments of the invention. The method may be implemented, for example, using computing platform 100 of FIG. 1, using circuit 210 of FIG. 2, using circuit 299 of FIG. 2, using system 300 of FIG. 3, or using other suitable devices or systems. The method may be used, for example, to detect a connection status (e.g., connected or disconnected) of an input unit to a standard keyboard/mouse socket of a computing platform.

As indicated at box 410, the method may include, for example, monitoring an operational property of an input unit. This may include, for example, monitoring an operational voltage of a conductor able to carry data from the input unit to a motherboard, and/or monitoring a state (e.g., a "high" state or a "low" state) of an output of a detection circuit.

As indicated at box 420, the method may include, for example, determining that a disconnection event occurred, for example, based on the state of the output of the detection circuit, based on the monitored operational property, based on the monitored operational voltage, or using other suitable operations.

As indicated at box 430, the method may include, for example, sending an alert message indicating that a disconnection event occurred, e.g., within the computing platform from a detector to a component of the computing platform, or from the computing platform to another computing platform.

Other suitable operations or sets of operations may be used in accordance with embodiments of the invention.

Some embodiments of the invention may be implemented by software, by hardware, or by any combination of software and/or hardware as may be suitable for specific applications or in accordance with specific design requirements. Embodiments of the invention may include units and/or sub-units, which may be separate of each other or combined together, in whole or in part, and may be implemented using specific, multi-purpose or general processors or controllers, or devices as are known in the art. Some embodiments of the invention may include buffers, registers, stacks, storage units and/or memory units, for temporary or long-term storage of data or in order to facilitate the operation of a specific embodiment.

Some embodiments of the invention may be implemented, for example, using a machine-readable medium or article which may store an instruction or a set of instructions that, if executed by a machine, for example, by computing platform 100, by detector 140, by circuit 210, by circuit 299, by computing platform 310, or by other suitable machines, cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit (e.g., memory unit 101), memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
   a detector associated with a first computing platform to detect a connection status of an input unit connected to a standard socket of said first computing platform based on an operational property of said input unit; and
   an alert unit to provide an alert to a second computing platform when said input unit is disconnected from said standard socket of said first computing platform.

2. The apparatus of claim 1, wherein said operational property comprises an operational voltage of said input unit.

3. The apparatus of claim 2, wherein said detector comprises a capacitor to be charged when said input unit is connected to said standard socket of said first computing platform.

4. The apparatus of claim 3, wherein said capacitor is to be discharged when said input unit is disconnected from said standard socket of said first computing platform.

5. The apparatus of claim 1, wherein said detector provides an output signal indicating whether or not said input unit is connected to said standard socket of said first computing platform.

6. The apparatus of claim 1, wherein said first computing platform operates in a mode selected from a group consisting of a standby mode, a sleep mode, and a reduced-power mode.

7. The apparatus of claim 1, wherein said detector is to detect said connection status by detecting whether or not a stop-bit is received within a pre-determined time period.

8. The apparatus of claim 1, wherein said standard socket comprises a PS/2-type socket.

9. A computing platform comprising:
   a detector associated with a first computing platform to detect a connection status of an input unit connected to a standard socket of said first computing platform based on an operational property of said input unit;
   a processor to process a signal received by said socket; and
   an alert unit to provide an alert to a second computing platform when said input unit is disconnected from said standard socket of said first computing platform.

10. The computing platform of claim 9, wherein said operational property comprises an operational voltage of said input unit.

11. The computing platform of claim 10, wherein said detector comprises a capacitor to be charged when said input unit is connected to said standard socket of said first computing platform.

12. The computing platform of claim 11, wherein said capacitor is to be discharged when said input unit is disconnected from said standard socket of said first computing platform.

13. The computing platform of claim 9, wherein said detector provides an output signal indicating whether or not said input unit is connected to said standard socket of said first computing platform.

14. The computing platform of claim 9, wherein said first computing platform operates in a mode selected from a group consisting of a standby mode, a sleep mode, and a reduced-power mode.

15. The computing platform of claim 9, wherein said detector is to detect said connection status by detecting whether or not a stop-bit is received within a pre-determined time period.

16. The computing platform of claim 9, wherein said standard socket comprises a PS/2-type socket.

17. The computing platform of claim 9, further comprising said input unit operatively connected to said standard socket.

18. A system comprising:
  a first computing platform comprising:
    a standard socket to receive an input signal from an input unit; and
    a detector to detect a connection status of said input unit based on a property of said input signal; and
  a second computing platform operatively associated with said first computing platform.

19. The system of claim 18, wherein said operational property comprises an operational voltage.

20. The system of claim 18, wherein the first computing platform is to provide an alert to the second computing platform when said detector detects that said input unit is disconnected from said standard socket of the first computing platform.

21. The system of claim 18, comprising am alert unit to provide an alert when said input unit is disconnected from said standard socket of said first computing platform.

22. A method comprising:
  detecting a connection status of an input unit to a standard socket of a first computing platform based on an operational property of said input unit; and
  alerting a second computing platform in response to a disconnection of said input unit from said standard socket of said first computing platform.

23. The method of claim 22, wherein detecting comprises detecting based on an operational voltage of said input unit.

24. The method of claim 23, comprising charging a capacitor when said input unit is connected to said standard socket of said first computing platform.

25. The method of claim 22, wherein defecting comprises detecting said connection status by detecting whether or not a stop-bit is received within a pre-determined time period.

* * * * *